(12) United States Patent
Urano et al.

(10) Patent No.: US 7,349,795 B2
(45) Date of Patent: Mar. 25, 2008

(54) METHOD AND SYSTEM FOR ADAPTATION OF TRANSIENT ENGINE PERFORMANCE

(75) Inventors: Yasunori Urano, Tokyo (JP); Hitoshi Takada, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/571,920

(22) PCT Filed: Sep. 16, 2004

(86) PCT No.: PCT/JP2004/013524

§ 371 (c)(1),
(2), (4) Date: Dec. 28, 2006

(87) PCT Pub. No.: WO2005/028839

PCT Pub. Date: Mar. 31, 2005

(65) Prior Publication Data

US 2007/0156323 A1 Jul. 5, 2007

(30) Foreign Application Priority Data

Sep. 17, 2003 (JP) ............................. 2003-324878

(51) Int. Cl.
*G06F 19/00* (2006.01)
*G01M 15/00* (2006.01)
(52) U.S. Cl. ..................................... 701/113; 73/117.3
(58) Field of Classification Search ................ 701/113, 701/110, 114, 115; 73/117.3
See application file for complete search history.

(56) References Cited

U.S. PATENT DOCUMENTS

| 4,940,122 A * | 7/1990 | Fujieda ...................... 192/3.31 |
| 6,701,246 B2 * | 3/2004 | Riedle et al. ............... 701/110 |
| 7,054,738 B1 * | 5/2006 | Stotsky ...................... 701/115 |

FOREIGN PATENT DOCUMENTS

| EP | 1 279 814 A2 * | 1/2003 |
| JP | 5-288115 | 11/1993 |
| JP | 2000-257499 | 9/2000 |
| JP | 2002-245092 | 8/2002 |

* cited by examiner

*Primary Examiner*—Hieu T. Vo
(74) *Attorney, Agent, or Firm*—Smith, Gambrell & Russell, LLP

(57) ABSTRACT

A method and a system for adaptation of transient engine performance capable of reducing a time for the transient test of an engine and also reducing a man-hour for preparing control software for the engine, wherein the test is performed by using the actual engine in a transient state in which the rotation speed and torque of the engine vary in time sequence. Output data as the results of the test is taken in, and the relation of the output data with the controlled values of the control factors given to the engine is taken to generate a transient engine model in which the relation of the output to the input of the engine is described. By using the prepared transient engine model, a simulation is performed to know the requirements of a target performance which can be satisfied by changing the controlled values of any of the controlled factors to provide control data meeting the requirements of the target performance. The control logic of an engine control circuit is prepared by using the control data.

2 Claims, 4 Drawing Sheets

METHOD AND SYSTEM FOR ADAPTATION OF TRANSIENT ENGINE PERFORMANCE

TECHNICAL FIELD

The present invention is used for the transient testing of engines (internal combustion engines). In particular, the present invention relates to a transient testing method used for adapting the transient characteristics and performance of diesel engines to the required performance objectives and a system for the same. The present invention is designed to quickly build an engine control system satisfying the transient performance objectives of an engine.

BACKGROUND ART

The term "transient characteristics of an engine" refers not to the steady state, in which the speed and torque remain constant, but to characteristics obtained in cases, in which they change with time. For instance, it refers to engine characteristics in states, in which the speed etc. changes, such as during acceleration or during deceleration.

The measurement of output characteristics of a conventional engine, such as the torque output, exhaust, etc., in the transient states of the engine has been conducted using a technique, in which an actual engine is brought into the steady state, the output state of the engine is subjected to measurement, and the output of the engine is then estimated by substitution with transient state characteristics obtained by weighting the steady-state output data.

However, the measurement of steady-state engine characteristics has been a time consuming procedure in which after making changes to the control value of a controlled factor (e.g. the quantity of injected fuel, fuel injection timing, etc.) of an engine one would wait until a predetermined time (e.g. 3 minutes) passes before the steady state is reached and then measure the output in this state, where one would make changes to the control value of one controlled factor, conduct measurements upon lapse of a predetermined time after reaching the steady state, and then again make changes to the control value of a controlled factor and conduct measurements, etc.

Incidentally, in an actual vehicle, during travel, the engine spends more time in a state of acceleration or deceleration and less time in a state permitting travel at a constant speed. For this reason, it is important to measure engine characteristics in transient states. In addition, in recent years, exhaust-related regulations have been directed not at regulation based on the steady-state exhaust values of an engine, as was done before, but at regulation based on regulatory values related to the transient-state exhaust of an engine. Consequently, it has become important to measure transient characteristics that define what kind of transient state exhaust is obtained when certain changes are made to certain controlled factors.

Incidentally, even during steady-state characteristic measurement, which was conducted, as described above, in order to determine what kind of output would be obtained if changes were made to the controlled factors of an engine in the steady-state, there were numerous controlled factors, with a particularly large number of controlled factors appearing when engine control was carried out by means of ECU-based electronic control, as a result of which the length of the test increased. For instance, parameters were added for various types of electronic control involved in engine control, such as EGR (Exhaust Gas Recirculation) valve control or VGT (Variable Geometry Turbo) control. During transient characteristic measurement, in a state in which the engine speed (rotational speed) and torque vary in the form of a time series, it is natural that the output data, likewise, appear as data varying in the form of a time series, as a result of which the number of controlled factors increases and the length of the test grows exponentially if measurements are attempted in the steady state by making changes to the control values of every single controlled factor.

For this reason, technology has been proposed, in which engine control etc. is evaluated using simulation virtually reproducing the characteristics of the engine and the vehicle (see Patent Document 1).

In this technology a virtual vehicle model, complete with an engine, is created for each vehicle type in a simulator in advance, whereupon various control inputs, for instance, control values for the slot aperture, crank angle, and other controlled factors, are inputted into the vehicle model, and an attempt is made to estimate engine speed, vehicle speed, and exhaust temperature sensor values as outputs of the virtual vehicle model based on the inputted control values.

Patent Document 1: JP H11-326135

DISCLOSURE OF THE INVENTION

Problems to be Solved by the Invention

Because the number of controlled factors used in an engine has increased in recent years, when measurement of steady state and transient state characteristics is attempted in a real engine, as described above, it takes a long time to obtain test data, which has become a bottleneck in engine development.

In addition, the technique consisting in deploying a vehicle model, including a virtual engine model, in a simulator and using it to observe the behavior of the engine is useful in terms of allowing for reductions in the length of engine development. However, in the above-described publicly known documents, the purpose is to build a simulation of a vehicle model and not to create a simulation of transient state phenomena in an engine and use it to evaluate required performance in the transient states of the engine. In addition, poor operability has been a problem in case of making changes to the control values of the respective controlled factors of an engine according to the transient state and estimating their results.

Means for Solving the Problems

In the present invention, testing is conducted in a real engine in transient states, in which the rotational speed, torque, etc. of the engine vary in the form of a time series. A transient engine model (simulator) describing the relationship between engine output versus input is created by capturing output data as a result of testing and establishing correspondence relationships with the control values of the controlled factors supplied to the engine. During transient testing, to capture the necessary data, an engine is operated in a transient mode by making changes to the control value of a single controlled factor of the engine, to a combination of two factors, or to a combination of a greater number of multiple controlled factors.

The created transient engine model is used to conduct a simulation to determine which changes should be made to the control value of a certain controlled factor to satisfy the performance objectives and to acquire control values satisfying the performance objectives. The acquired control values are then used to conduct transient testing using a real engine to confirm whether the performance objectives are satisfied. When output data satisfying the objectives is obtained, a control logic for an engine control circuit (ECU) is created based on the control values used in the simulation of the transient engine model.

In other words, according to a first aspect of the present invention, there is provided a method for adaptation of transient engine performance comprising the steps of conducting transient testing, during which an engine is operated in a transient state by making changes to the control values of controlled factors supplied to the engine and its output is captured; capturing engine output data produced by the transient testing and creating a transient model of the tested engine based on the relationship between the output data and data concerning the supplied controlled factors; obtaining control values of controlled factors that satisfy transient performance objectives required of said engine, using the transient model that has been created; confirming whether the required transient performance objectives are satisfied by conducting transient testing by supplying the control values obtained from the transient model to the real engine; and creating control software for a control circuit controlling the engine if the confirmation step finds that the required transient performance objectives are satisfied.

According to a second aspect of the present invention, there is provided a system for adaptation of transient engine performance including real engine transient test execution means for carrying out transient testing by making changes to control values of controlled factors of an engine; transient model creation means for capturing engine output data produced by the transient testing and creating a transient model describing the relationship between the engine's control input and the output data based on said output data and the control values supplied by the real engine transient test execution means; transient model simulation means for obtaining control values of the controlled factors, at which the transient model satisfies the performance objectives required of the engine during transient testing, using the transient model created by the transient model creation means; and means for supplying the real engine transient test execution means with the engine control values satisfying the performance objectives obtained by conducting the simulation using the simulation means.

Effects of the Invention

In the present invention, engine control values that satisfy performance objectives can be acquired within a short period of time and transient testing can be conducted in a transient state without substitution of steady-state test data. In addition, it allows for a reduction in the number of man-hours needed for creating control software for an engine satisfying the performance objectives, as well as allows for easily creating control software for an engine control circuit. The present invention can reduce the time needed for engine development and can reduce the duration of product development.

Figure 1:
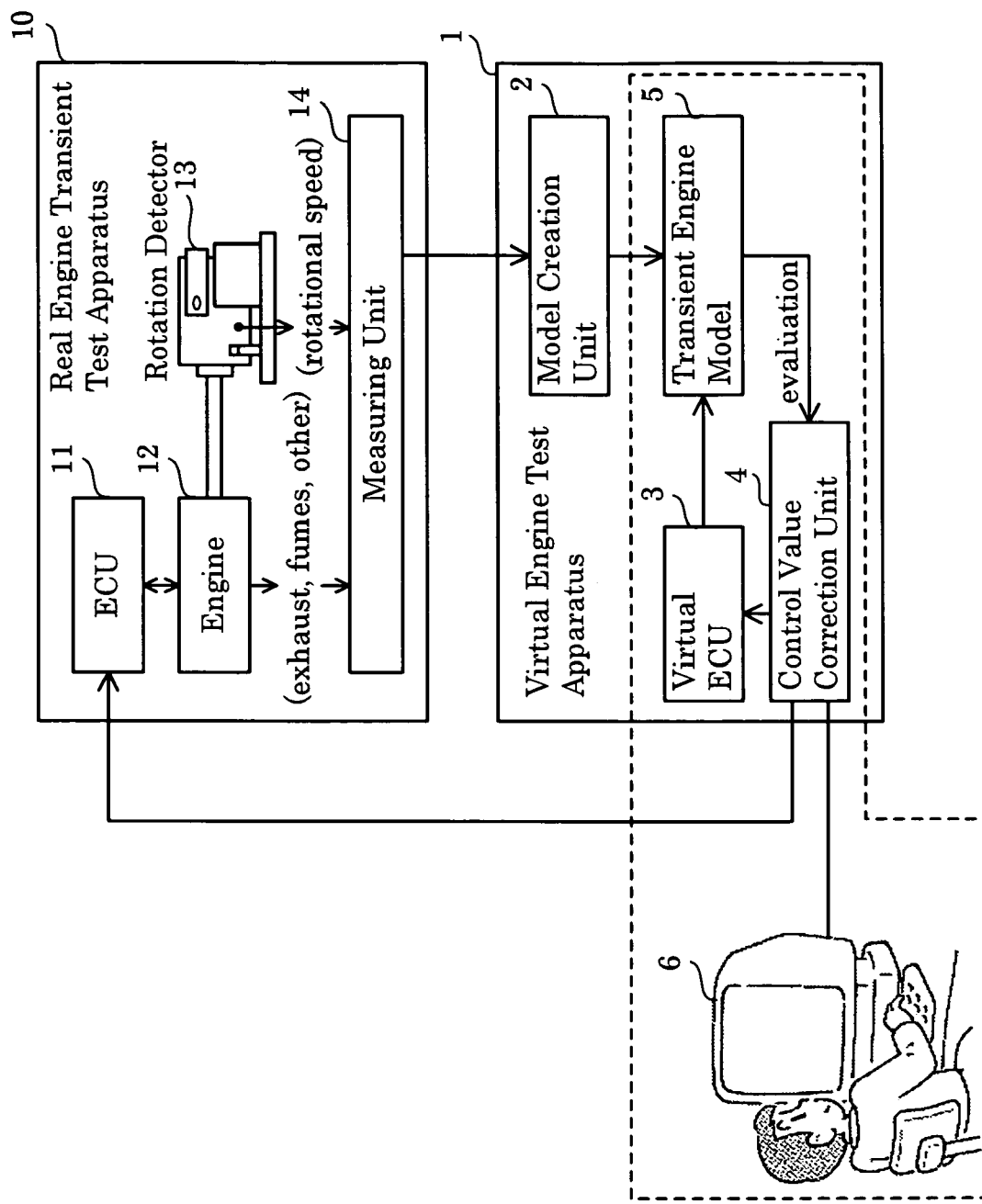
FIG. 1 is a diagram illustrating the system configuration of the present embodiment.

DESCRIPTION OF REFERENCE NUMERALS 1. virtual engine test apparatus;
2. model creation unit;
3. virtual ECU;
4. control value correction unit;
5. transient engine model;
6. operator terminal;
10. real engine transient test apparatus;
11. ECU;
12. engine;
13. rotation detector; and
14. measuring unit.

BEST MODE FOR CARRYING OUT THE INVENTION

Figure 2:
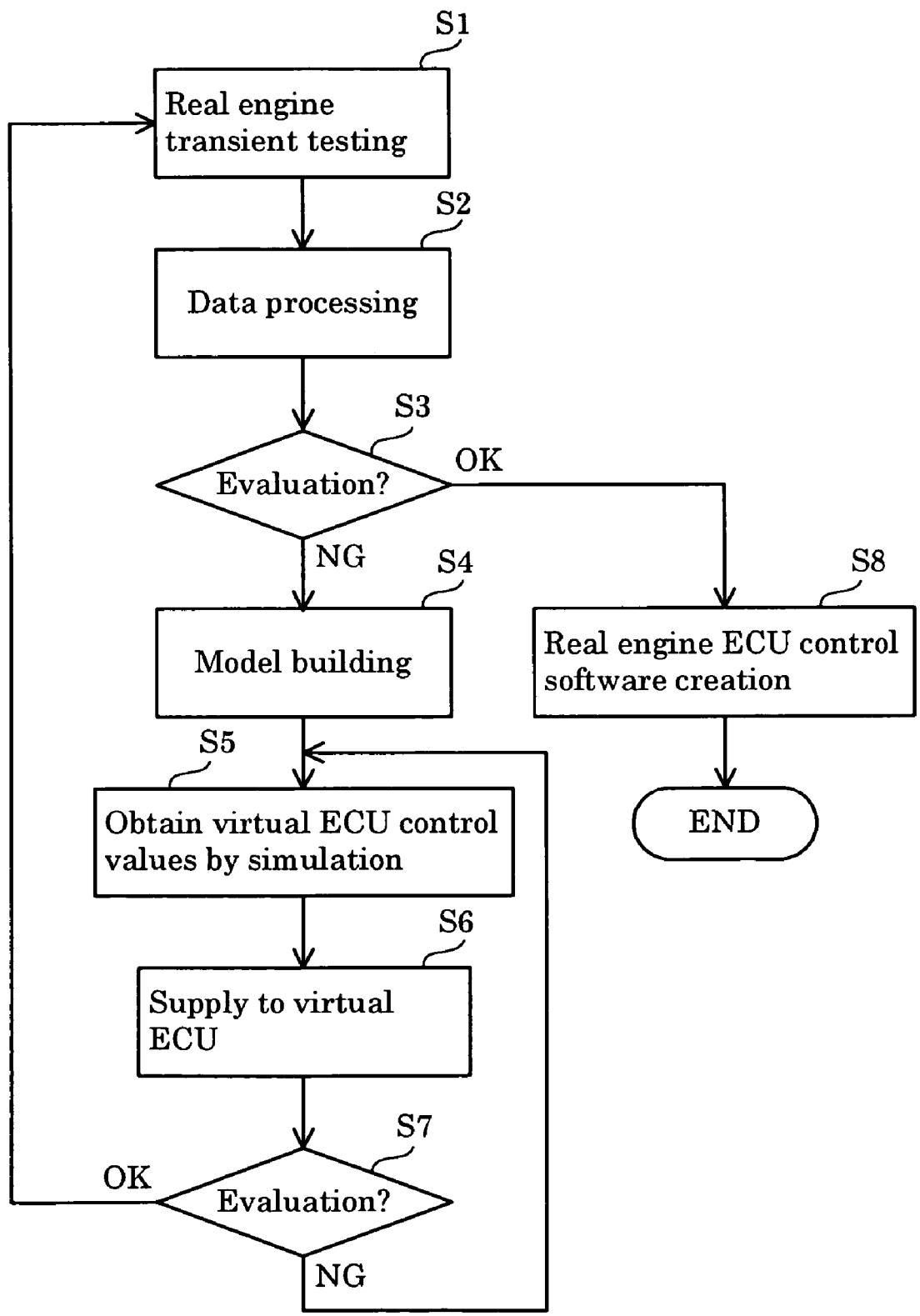
FIG. 2 is a flow chart illustrating the operation of the present embodiment.

FIG. 1 illustrates a system configuration used in an embodiment of the present invention. FIG. 2 is a diagram explaining all the steps involved in transient engine performance adaptation. FIG. 1 is a real engine transient test apparatus, where 11 represents an ECU (real engine), 12 an engine (real engine) controlled by the ECU 11, 13 a rotation detector used for detecting the speed of the crankshaft of the engine 12, and 14 a measuring unit used for measuring exhaust, fumes, and other parameters (fuel consumption, etc.) of the engine 12 as well as the speed outputted from the rotation detector 13. In addition, 1 is a virtual engine test apparatus characteristic of the present invention, 2 a model creation unit, 3 a virtual ECU, 4 a control value correction unit, and 5 a transient engine model. In addition, 6 is an operator terminal used by an operator conducting the transient testing.

Specifically, an embodiment of the present invention, as illustrated in FIG. 1, is a system for adaptation of transient engine performance equipped with a real engine transient test apparatus 10 for carrying out transient testing by making changes to the control values of the controlled factors of an engine, as well as with a model creation unit 2 for capturing engine output data produced by the transient testing and creating a transient model describing the relationship between the engine's control input and the output data based on said output data and control values supplied by the real engine transient test apparatus 10, a virtual ECU 3 operating as transient model simulation means (portion enclosed by the dotted line) using the transient model created by the model creation unit 2 to obtain the control values of the controlled factors, at which the transient model satisfies the performance objectives required of the engine during transient testing, a transient engine model 5, a control value correction unit 4, and an operator terminal 6 provided in a virtual engine test apparatus 1, with the control value correction unit 4 equipped with means for supplying the real engine transient test apparatus 10 with engine control values satisfying the performance objectives obtained by conducting the simulation using the virtual ECU 3.

The control value correction unit 4 includes means for displaying control values supplied to the transient model on the operator terminal 6 as time-series data, correcting the control values in the displayed time series and supplying them to the transient model.

In addition, as illustrated in FIG. 2, an embodiment of the present invention is a method for adaptation of transient engine performance comprising the steps of conducting transient testing, during which an engine is operated in a transient state by making changes to the control values of controlled factors supplied to the engine and its output is captured (S1); capturing engine output data produced by the transient testing and creating a transient model of the tested engine based on the relationship between the output data and data concerning the supplied controlled factors (S2, S4); obtaining control values of the controlled factors that satisfy the transient performance objectives required of said engine, using the transient model that has been created (S5, S6, S7); confirming whether the required transient performance objectives are satisfied by conducting transient testing by supplying the control values obtained from the transient model to the real engine (S3); and creating control software for a control circuit controlling the engine if the confirmation step finds that the required transient performance objectives are satisfied (S8).

Figure 3:
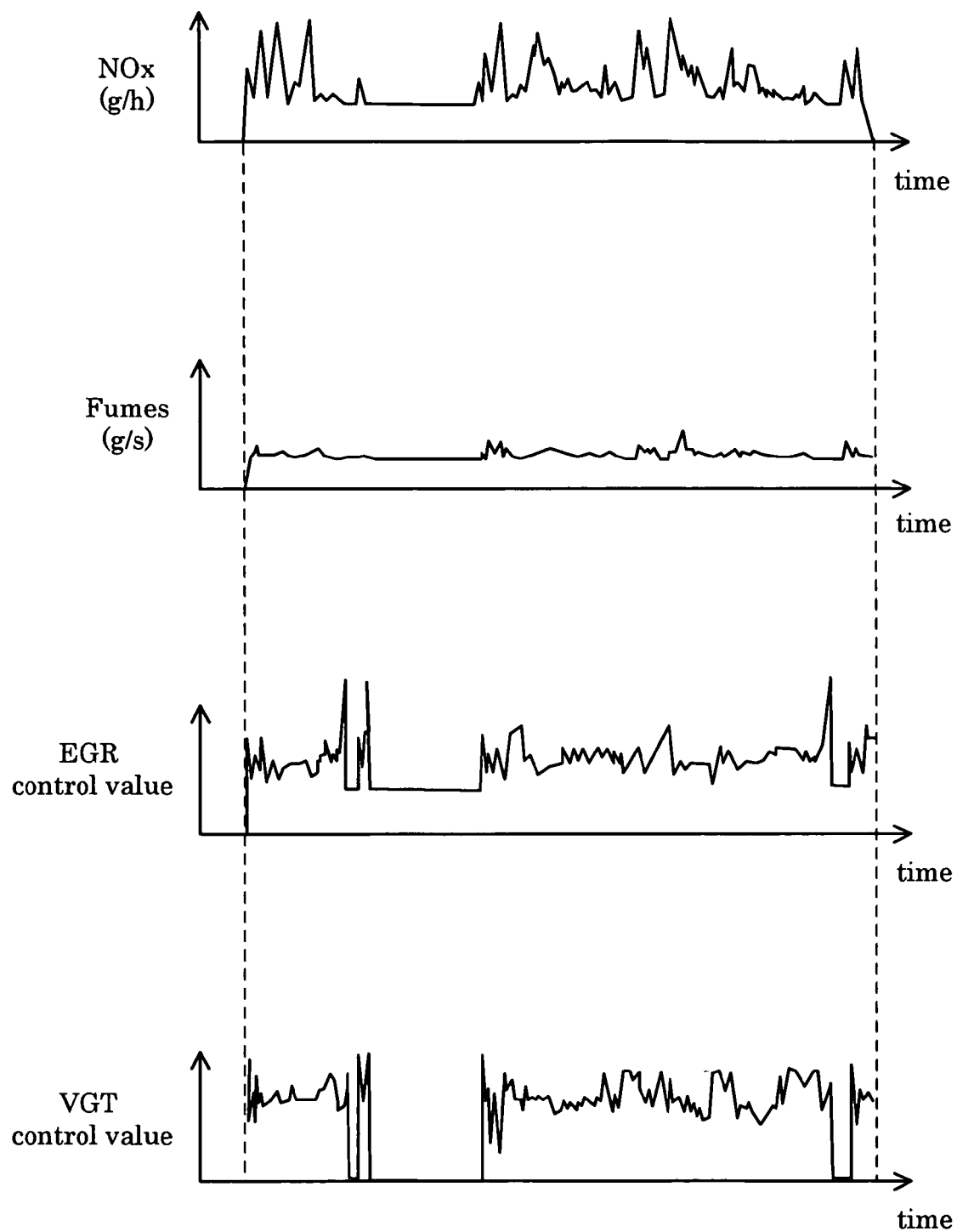
FIG. 3 is a diagram illustrating observation values obtained by real engine transient testing in the present embodiment.
Figure 4:
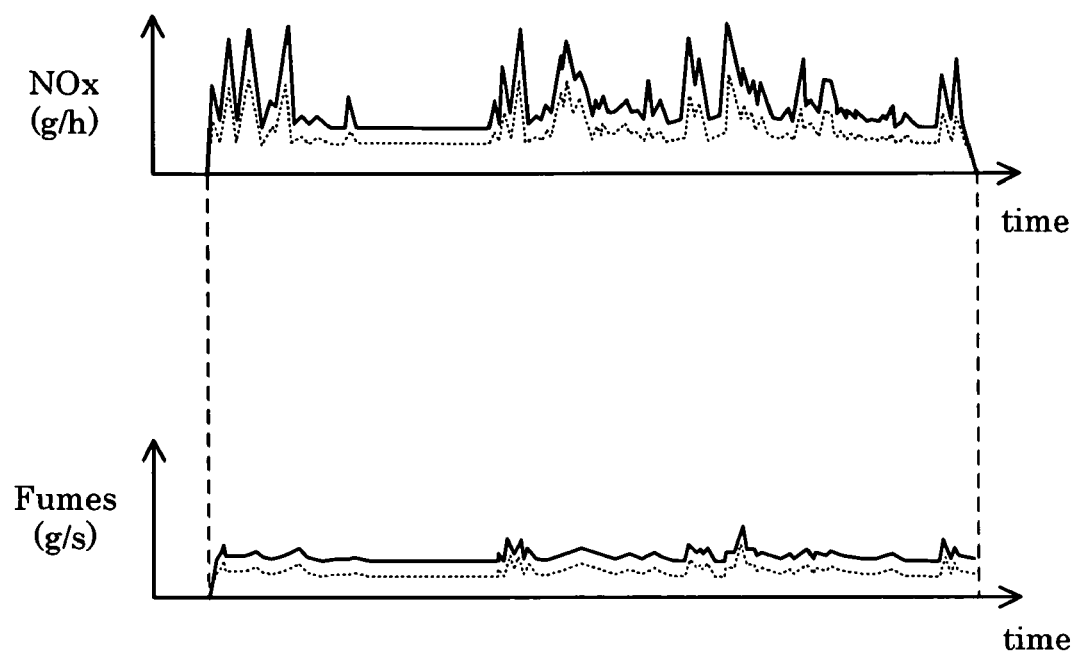
FIG. 4 is a diagram illustrating virtual observation values and target values of the present embodiment.
Figure 5:
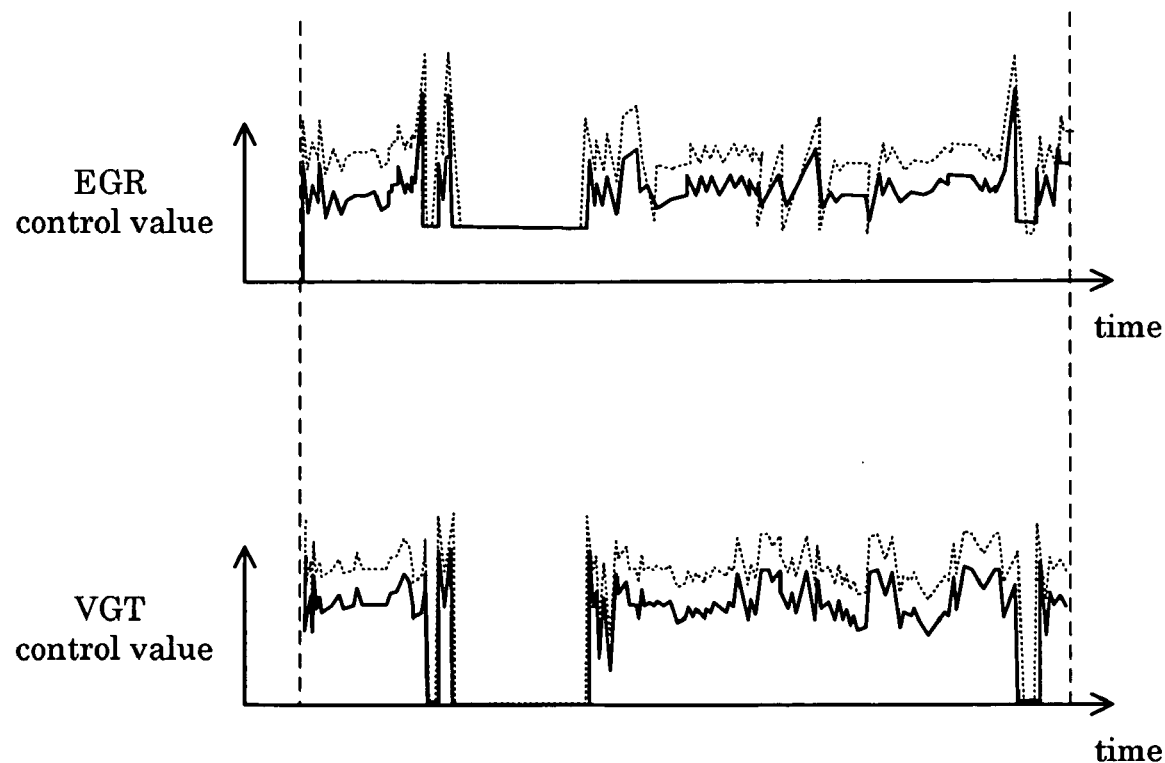
FIG. 5 is a diagram illustrating current control values and target control values of the present embodiment.

Next, explanations are provided regarding the operation of the present embodiment by referring to FIGS. 3 to 5. Transient characteristic measurements are carried out with the real engine transient test apparatus 10 illustrated in FIG. 1 using an actual engine. The results of the transient characteristic measurements in an actual engine are illustrated in FIG. 3. In the present embodiment, the number of grams of NOx per hour (g/h) and the number of grams of fumes per second (g/s) are plotted along the respective Y-axis and time is plotted along the X-axis. In addition, VGT control values and EGR control values used in this state are plotted along the respective Y-axis and time is plotted along the X-axis. The measurements are conducted in the configuration illustrated in FIG. 1 by the measuring unit 14 of the real engine transient test apparatus 10. Also, in the flow chart illustrated in FIG. 2, this corresponds to real engine transient testing (Step S1) and data processing (Step S2).

A model is created next. In the configuration illustrated in FIG. 1, this is done by the model creation unit 2 of the virtual engine test apparatus 1. Also, in the flow chart illustrated in FIG. 2, this corresponds to model creation (Step S4). Because observation results obtained for a real engine are substituted into the model "as is" in the initial stage of model creation, the model is created based on the transient characteristic measurement results illustrated in FIG. 3. The model is created in the form of a transient engine model 5 and a virtual ECU 3.

Control values for the model are created next. In the configuration illustrated in FIG. 1, this is done by the control value correction unit 4 of the virtual engine test apparatus 1. Also, in the flow chart illustrated in FIG. 2, this corresponds to obtaining virtual ECU control values by means of simulation (Step S5), supplying them to the virtual ECU (Step S6), and conducting evaluation (Step S7). FIG. 4 illustrates the target values (dotted line) for the virtual observation values (solid line) for NOx and fumes, respectively. In FIG. 4, the result of the evaluation (Step S7) is NG because the difference between the virtual observation values and target values is not within an acceptable range.

Control value correction is carried out next in order to bring the virtual observation values closer to the target values. In the configuration illustrated in FIG. 1, this is done by the control value correction unit 4 of the virtual engine test apparatus 1. Also, in the flow chart illustrated in FIG. 2, this corresponds to obtaining virtual ECU control values by simulation (Step S5). FIG. 5 shows control values before (solid line) and after (dotted line) correction. The correction is performed by an operator.

In the present embodiment, two methods are used for control value correction. The first one is a method, in which changes are made to the control values themselves using the operator terminal 6. The second one is a method, in which control values supplied to the transient model, such as those shown in FIG. 5, are displayed on the operator terminal 6 as time-series data, after which the control values in the displayed time series are corrected and supplied to the transient model. In other words, the operator issues instructions so as to increase or decrease control values directly, using a mouse etc., by modifying a graph such as the one shown in FIG. 5 with a solid line, which is displayed on the display of the operator terminal 6. By doing so, the operator can make changes to the control values while visually recognizing changes to the shape of the graph (for instance, the dotted line in FIG. 5).

The thus modified control values are again supplied to the virtual ECU 3 (S6) and evaluation is carried out (S7). As a result, when the difference between the virtual observation results and the target results is within an acceptable range, the corrected control values are inputted to the ECU 11 of the real engine transient test apparatus 10. By doing so, the real engine is controlled using the corrected control values.

Next, the steps S1, S2, and S3 of the flow chart illustrated in FIG. 2 are executed again. As a result, the steps S1-S7 are repeatedly executed until the observation values and target values fall within an acceptable range. A real engine ECU control software program is created when evaluation in Step S3 finds that the observation values and target values are within an acceptable range. In the configuration illustrated in FIG. 1, this is done by the control value correction unit 4 of the virtual engine test apparatus 1. Also, in the flow chart illustrated in FIG. 2, this corresponds to real engine ECU control software creation (Step S8).

By doing so, it is possible to quickly produce control values, at which the observation values and target values are within an acceptable range.

INDUSTRIAL APPLICABILITY

In the present invention, engine control values that satisfy performance objectives can be acquired within a short period of time and transient testing can be conducted in a transient state without substitution of steady-state test data. In addition, it allows for a reduction in the number of man-hours needed for creating control software for an engine satisfying the performance objectives, as well as allows for easily creating control software for an engine control circuit. The present invention can reduce the time needed for engine development and can reduce the duration of product development.

The invention claimed is:

1. A system for adaptation of transient engine performance comprising:
real engine transient test execution means for carrying out transient testing by making changes to control values of controlled factors of an engine;
transient model creation means for capturing engine output data obtained by the transient testing and creating a transient model describing the relationship between the engine's control input and the output data based on said output data and the control values supplied by the real engine transient test execution means;

transient model simulation means for obtaining control values of the controlled factors, at which the transient model satisfies performance objectives required of the engine during transient testing, using the transient model created by the transient model creation means; and means for supplying the real engine transient test execution means with the engine control values satisfying the performance objectives obtained by conducting the simulation using the simulation means.

2. A method for adaptation of transient engine performance comprising the steps of:

conducting transient testing, during which an engine is operated in a transient state by making changes to control values of controlled factors supplied to the engine and its output is captured;

capturing engine output data produced by the transient testing and creating a transient model of the tested engine based on the relationship between the output data and data concerning the supplied controlled factors;

obtaining control values of controlled factors that satisfy transient performance objectives required of said engine, using the transient model that has been created;

confirming whether the required transient performance objectives are satisfied by conducting transient testing by supplying the control values obtained from the transient model to the real engine; and creating control software for a control circuit controlling the engine if the confirmation step finds that the required transient performance objectives are satisfied.

* * * * *